(12) United States Patent
Sakakura et al.

(10) Patent No.: US 8,229,628 B2
(45) Date of Patent: Jul. 24, 2012

(54) ELECTRIC STEERING LOCK DEVICE

(75) Inventors: Hiroaki Sakakura, Kanagawa-ken (JP); Kazuhisa Yabumoto, Kanagawa-ken (JP); Kazuo Tsukada, Kanagawa-ken (JP)

(73) Assignee: Alpha Corporation, Yokohama-shi, Kanagawa-ken (JP)

( * ) Notice: Subject to any disclaimer, the term of this patent is extended or adjusted under 35 U.S.C. 154(b) by 461 days.

(21) Appl. No.: 12/309,760

(22) PCT Filed: Jul. 30, 2007

(86) PCT No.: PCT/JP2007/064853
§ 371 (c)(1),
(2), (4) Date: Jan. 29, 2009

(87) PCT Pub. No.: WO2008/015990
PCT Pub. Date: Feb. 7, 2008

(65) Prior Publication Data
US 2009/0259366 A1    Oct. 15, 2009

(30) Foreign Application Priority Data
Jul. 31, 2006    (JP) .................................. 2006-207994

(51) Int. Cl.
| | |
|---|---|
| *A01B 69/00* | (2006.01) |
| *B62D 6/00* | (2006.01) |
| *B62D 11/00* | (2006.01) |
| *B62D 12/00* | (2006.01) |
| *B63G 8/20* | (2006.01) |
| *B63H 25/04* | (2006.01) |
| *G05D 1/00* | (2006.01) |
| *G06F 7/00* | (2006.01) |

(52) U.S. Cl. ......................................................... 701/41
(58) Field of Classification Search .................... 70/207, 70/225, 226; 701/41
See application file for complete search history.

(56) References Cited

U.S. PATENT DOCUMENTS
7,254,466 B2 * 8/2007 Mori et al. ......................... 701/1
(Continued)

FOREIGN PATENT DOCUMENTS
| | | |
|---|---|---|
| DE | 198 09 295 C1 | 5/1999 |
| EP | 1 645 479 A1 | 4/2006 |
| JP | 59-014562 A | 1/1984 |

(Continued)

OTHER PUBLICATIONS

Extended European Search Report issued on May 24, 2011, in counterpart European Application No. 07791546.0.

*Primary Examiner* — James Trammell
*Assistant Examiner* — Michael D Lang
(74) *Attorney, Agent, or Firm* — The Nath Law Group; Jerald L. Meyer; Stanley N. Protigal

(57) ABSTRACT

There are provided a lock member configured to be displaced between a locking position for prohibiting rotation of a steering shaft and an unlocking position for permitting rotation of the steering shaft, a first detection switch (SW1) for detecting a locked state of the steering shaft, a second detection switch (SW2) and a third detection switch (SW3) for detecting an unlocked state of the steering shaft, and an electric steering lock controller (30) configured to determine a position of the lock member, based on detection outputs from the first detection switch (SW1) and the second detection switch (SW2), and thus to control driving of the lock member. Lock and unlock information from the electric steering lock controller (30) and detection outputs from the second detection switch (SW2) and the third detection switch (SW3) are outputted to a vehicle-side controller (31).

5 Claims, 16 Drawing Sheets

U.S. PATENT DOCUMENTS

| | | | |
|---|---|---|---|
| 7,589,433 B2 * | 9/2009 | Otani et al. | 307/10.2 |
| 7,714,459 B2 * | 5/2010 | Hirche et al. | 307/10.2 |
| 2006/0091729 A1 * | 5/2006 | Kamiya et al. | 307/10.1 |
| 2009/0193861 A1 * | 8/2009 | Kudou et al. | 70/187 |

FOREIGN PATENT DOCUMENTS

| | | |
|---|---|---|
| JP | 2004-106750 A | 4/2004 |
| JP | 2005-214118 A | 8/2005 |
| WO | WO 2004/098960 A1 | 11/2004 |

* cited by examiner

FIG. 13

|  | NORMAL MOMENT | MOMENT OF FAILURE ON SW2 SIDE | MOMENT OF FAILURE ON SW3 SIDE |
|---|---|---|---|
| OUTPUT OF SW2 | L | H | L |
| OUTPUT OF SW3 | H | H | L |

ELECTRIC STEERING LOCK DEVICE

TECHNICAL FIELD

The present invention relates to an electric steering lock device configured to lock rotation of a steering shaft of an automobile.

BACKGROUND ART

There has been known a conventional electric steering lock device disclosed in the Japanese Patent brochure of Patent Application Laid-Open No. 2005-214118 (Patent Document 1). As shown in FIG. 14, the conventional electric steering lock device 100 of this type includes: a lock member 102 configured to be displaced between a locking position for prohibiting rotation of a steering shaft 101 and an unlocking position for permitting rotation of the steering shaft; a first switch SW1 configured to detect that the steering shaft 101 is locked; a second switch SW2 configured to detect that the steering shaft 10 is unlocked; and a CPU 103 that is an electric steering lock controller configured to determine a position of the lock member, based on detection outputs from the first detection switch SW1 and the second detection switch SW2, and thus to control driving of the lock member 102. Meanwhile, lock and unlock information from the CPU 103 and the detection output from the second detection switch SW2 are supplied to a starter control device 104 that is a vehicle-side controller. The starter control device 104 determines the locked state and the unlocked state of the steering shaft 101 based on these input states. Moreover, the starting and the like of the engine are performed based on an engine start instruction, only when the steering shaft 101 is in the unlocked state. The engine is not started, even if the engine start instruction is given, when the steering shaft 101 is located in the locked position.

Incidentally, in the electric steering lock device 100, it is necessary to surely avoid such a situation that the starter control device 104 starts the engine in accordance with erroneous information being outputted to the starter control device 104 and indicating that the steering shaft 101 is located in the unlocked position in spite of the fact that the steering shaft 101 is actually located in the locked position.

In the above conventional example, the output from the second detection switch SW2 and the output from the CPU 103 are supplied to the starter control device 104. Therefore, when unlock information is erroneously outputted due to a failure of the second detection switch SW2 though the steering shaft 101 is actually located in the locked position, it is possible to determine that there is the failure of the electric steering lock device 100 by use of lock information from the CPU 103. Meanwhile, when the unlocked state is erroneously detected due to runaway or the like of the CPU 103 though the steering shaft 101 is actually located in the locked position, it is possible to determine that there is the failure of the electric steering lock device 100 by use of lock information (information of not being located in the unlocked position, to be accurate) from the second detection switch SW2.

However, it is impossible to determine the failure of the electric steering lock device 100 when the output information from both the second detection switch SW2 and the CPU 103 to the starter control device 104 is the erroneous information (the erroneous information indicating that the steering shaft 101 is located in the locked position) at the same time. Specifically, there is a problem that determining the failure of the electric steering lock device 100 is impossible when the failure of the second detection switch SW2 and the runaway or the like of the CPU 103 occur at the same time.

To solve this problem, an electric steering lock device shown in FIG. 15 and FIG. 16 is conceivable. The electric steering lock device 110 includes: a lock member configured to be displaced between a locking position for prohibiting rotation of a steering shaft and an unlocking position for permitting rotation of the steering shaft; a first detection switch SW1 configured to detect that the steering shaft is locked; second, third and fourth detection switches SW2, SW3 and SW4 configured to detect that the steering shaft is unlocked; and an electric steering lock controller 111 configured to determine a position of the lock member, based on detection outputs from the first detection switch SW1 and the second detection switch SW2, and thus to control driving of the lock member. Lock and unlock information of the electric steering lock controller 111 and detection outputs from the third detection switch SW3 and the fourth detection switch SW4 are outputted to a vehicle-side controller (not shown).

With this configuration, it is possible to determine a failure of the electric steering lock device 110, even if a failure on either the third detection switch SW3 or the fourth detection switch SW4 for detecting the unlocked position and runaway or the like of the electric steering lock controller 111 occur at the same time. Specifically, the vehicle-side controller acquires the locked position information (of not being located in the unlocked position, to be accurate) from the unbroken switch out of the third detection switch SW3 and the fourth switch SW4 so that a determination can be made that there is a failure in the electric steering lock device 110. For example, even if the electric steering lock controller 111 outputs erroneous information of being located in the unlocked position though the steering shaft is actually located in the locked position and the third detection switch SW3 outputs an L signal (indicated with a broken line in FIG. 16) due to a failure, it is possible to determine the failure of the electric steering lock controller 111 and the third detection switch because the fourth detection switch SW4 outputs an H signal.

However, there is a problem of increase in cost and size of the electric steering lock device 110 because it is necessary to provide the electric steering lock device 110 with the four switches SW1 to SW4.

Accordingly, the present invention has been made to solve the above-described problem and an object thereof is to provide an electric steering lock device that is capable of outputting a signal to enable determination of failures even if a failure on a detecting module side and a failure on a control side occur at the same time, and also capable of reducing the number of detecting module.

DISCLOSURE OF THE INVENTION

To attain the object, an electric steering lock device based on a first aspect of the present invention includes: a lock member configured to be displaced between a locking position for prohibiting rotation of a steering shaft and an unlocking position for permitting rotation of the steering shaft; first detecting means (module) for detecting a locked state of the steering shaft; second detecting means (module) and third detecting means (module) for detecting an unlocked state of the steering shaft; and an electric steering lock controller configured to determine a position of the lock member, based on detection outputs from the first detecting means and the second detecting means, and thus to control driving of the lock member. In the configuration, lock and unlock information from the electric steering lock controller and detection outputs from the second detecting means and the third detecting means are outputted.

An electric steering lock device based on a second aspect of the present invention dependent on the first aspect provides the above-described device, in which the lock and unlock information from the electric steering lock controller and the detection outputs from the second detecting means and the third detecting means are outputted to a vehicle-side controller.

An electric steering lock device based on a third aspect of the present invention dependent on the first aspect and the second aspect provides the above-described device, in which the first detecting means, the second detecting means, and the third detecting means are mounted on a single circuit board.

According to the first aspect and the second aspect of the present invention, even if a failure on any one of the second detecting means side and the third detecting means side for detecting the unlocked position and runaway or the like of the electric steering lock controller occur at the same time, it is possible to determine a failure of the electric steering lock device by acquiring information indicating that the vehicle-side controller is not located in the unlocked position from the unbroken detecting means (module) out of the second detecting means and the third detecting means. In this way, a signal for allowing determination of the failure is outputted to the vehicle-side controller even if the failures on the detecting means (module) side and the control side occur at the same time and it is sufficient to provide the three pieces of the detecting means. Hence it is possible to simplify the structure and to achieve cost reduction.

Meanwhile, according to the third aspect of the present invention, the first detecting means, the second detecting means, and the third detecting means are formed on a single circuit board. Therefore, it is easy to perform assembly, wiring, and the like of the first to third detecting means.

BRIEF DESCRIPTION OF THE DRAWINGS

FIG. 13 is a view showing states of output to a vehicle-side controller in a normal moment and various moments of failure when a steering shaft is in a locked state.

BEST MODES FOR CARRYING OUT THE INVENTION

Figure 1:
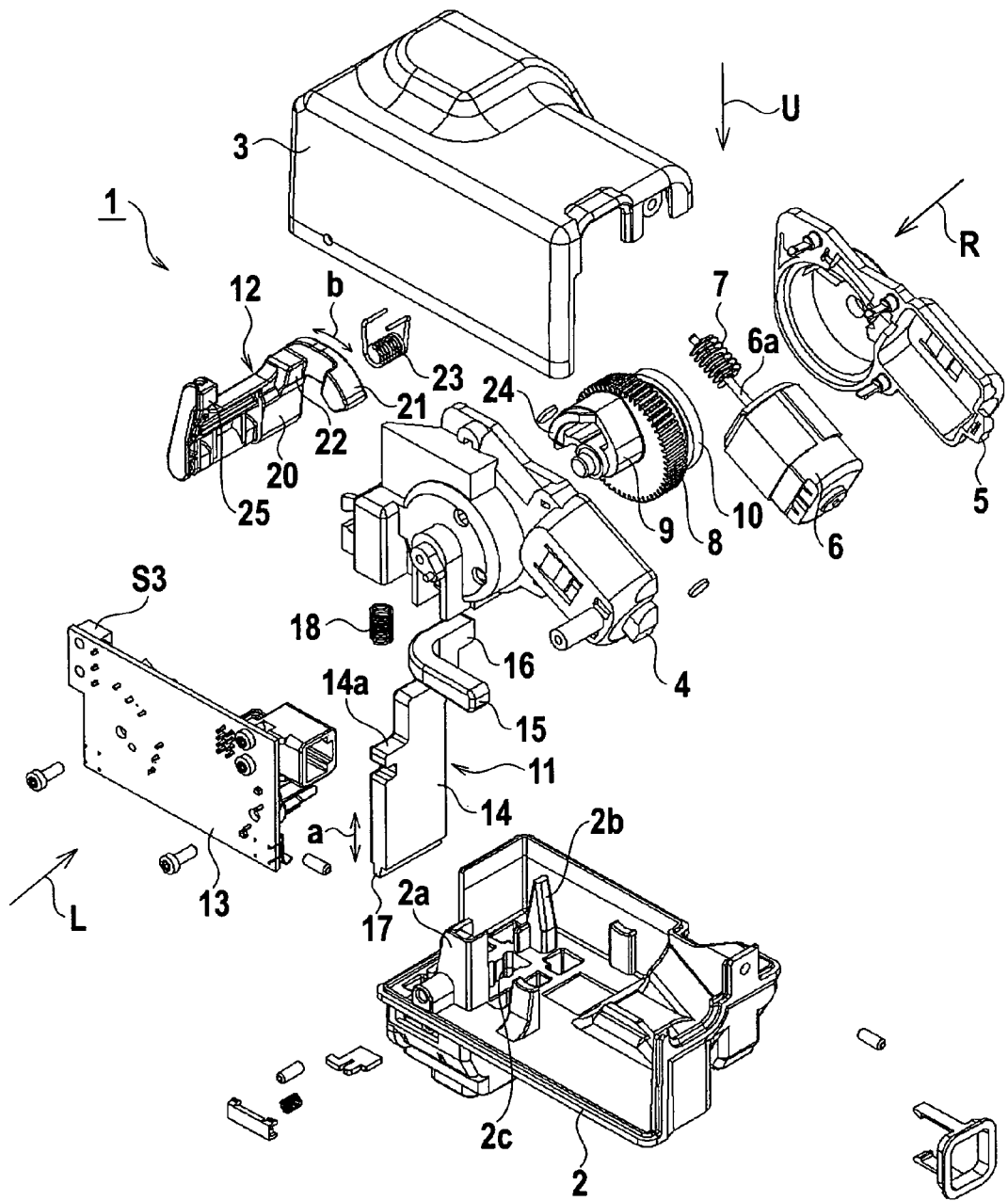
FIG. 1 is an exploded perspective view of an electric steering lock device showing an embodiment of the present invention.
Figure 10:
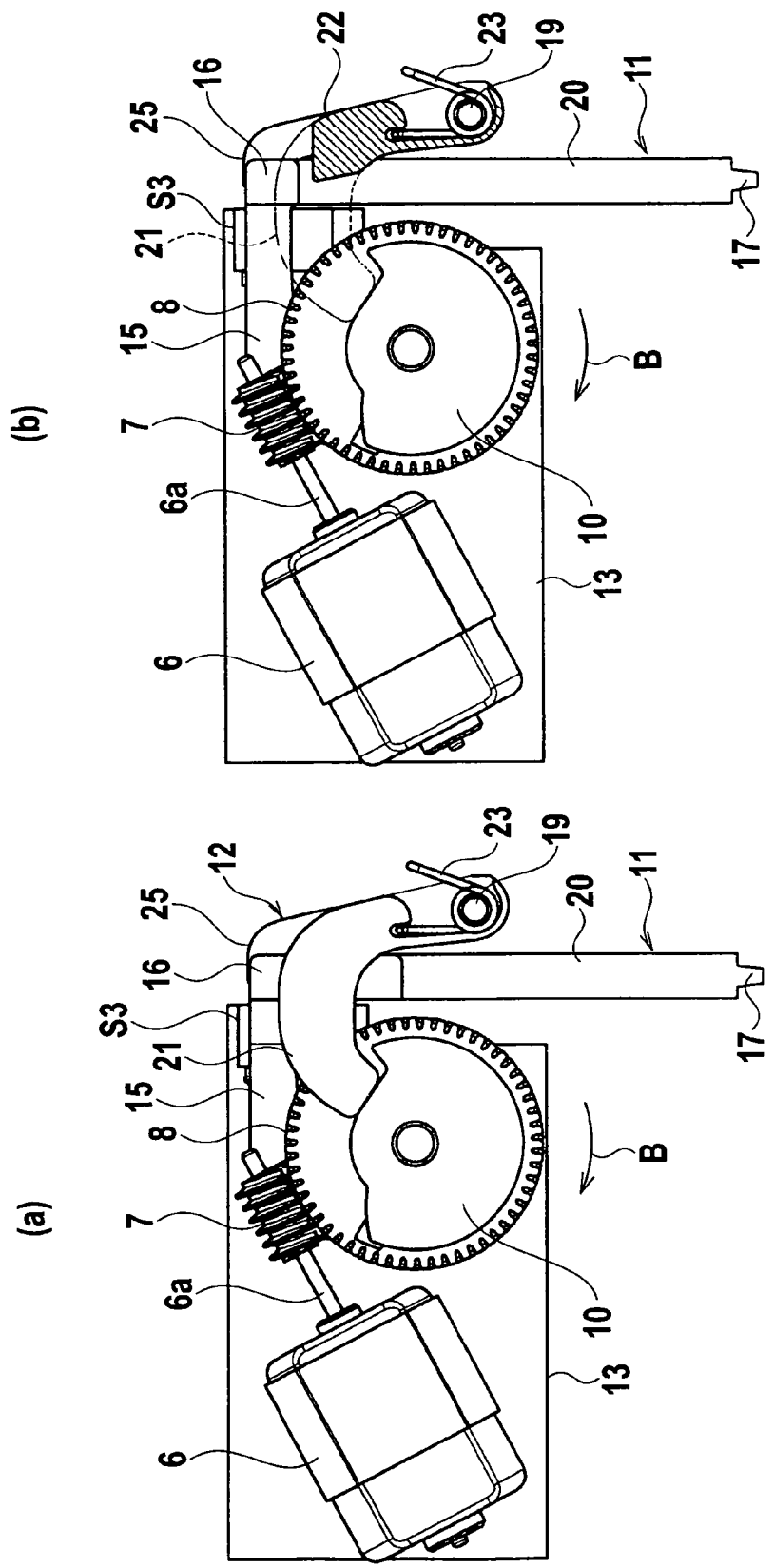
FIG. 10(*a*) is an operation explanatory view seen from the arrow R and FIG. 10(*b*) is a partially exploded operation explanatory view seen from the arrow R showing the embodiment of the present invention.
Figure 11:
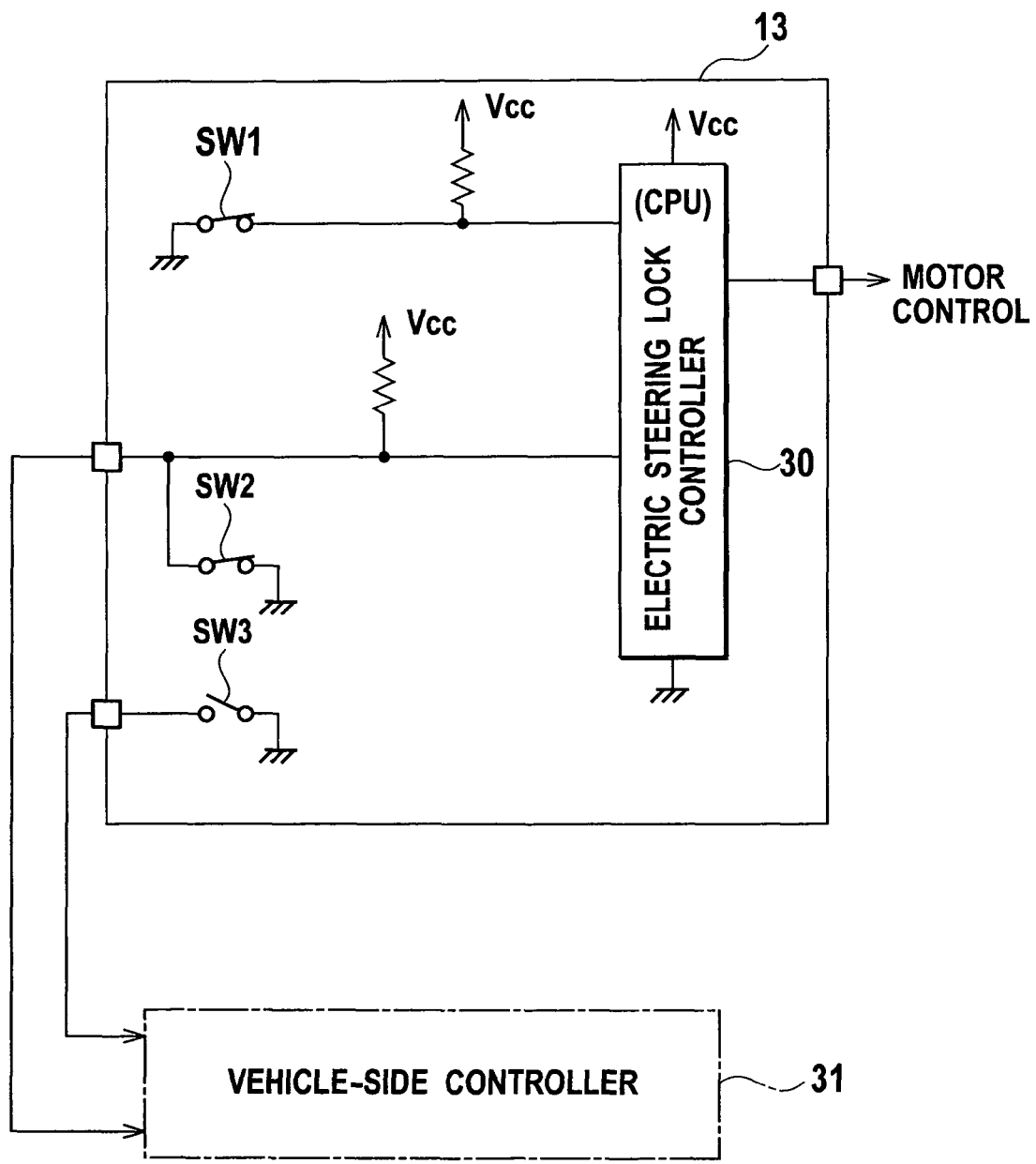
FIG. 11 is a circuit block diagram of a control system.
Figure 12:
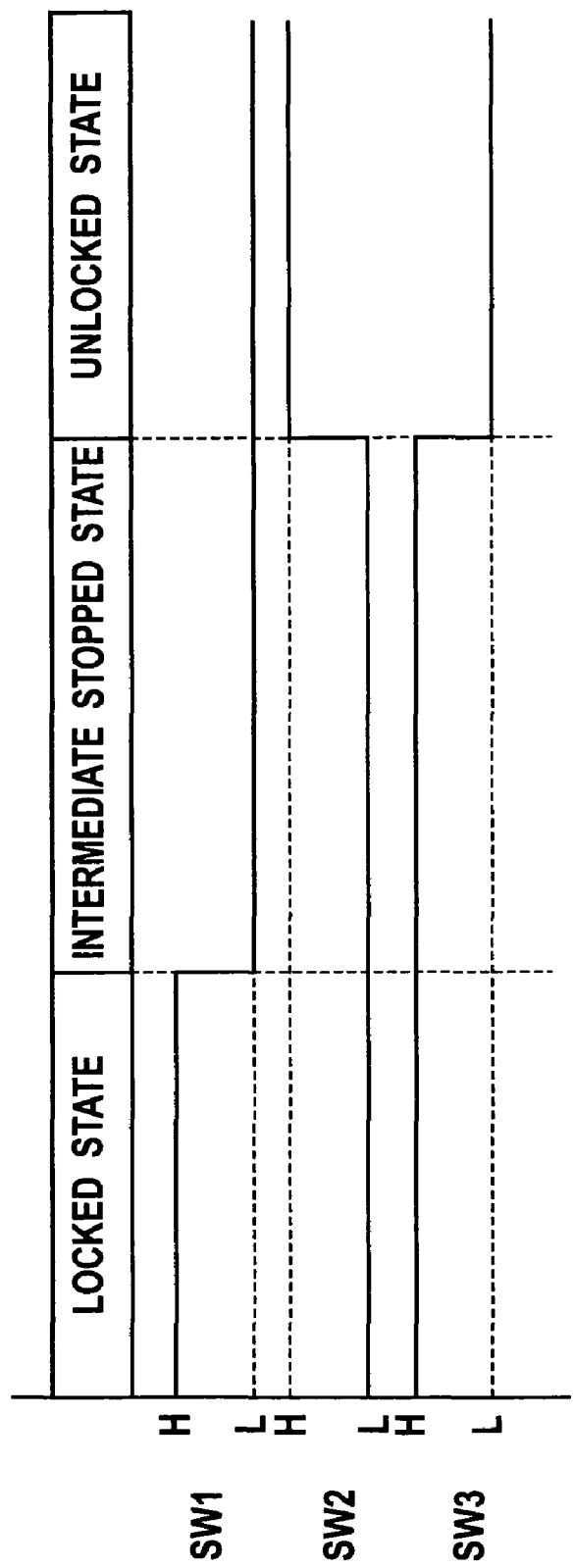
FIG. 12 is a waveform chart of outputs from respective units.
Figure 14:
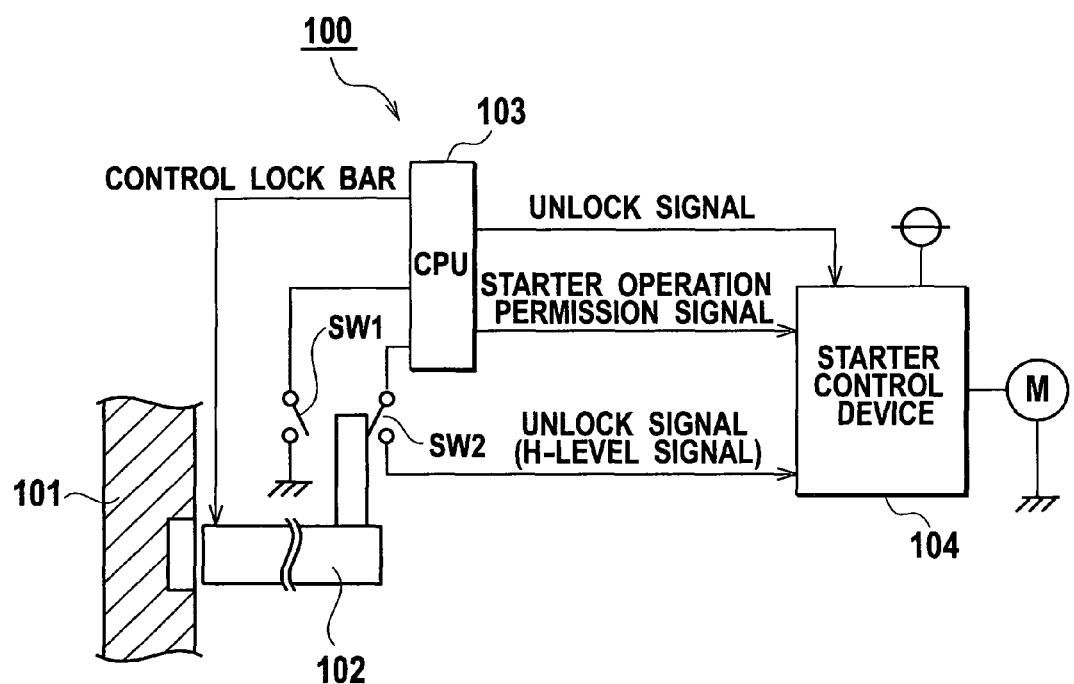
FIG. 14 is a circuit block diagram of a control system of a conventional example.
Figure 15:
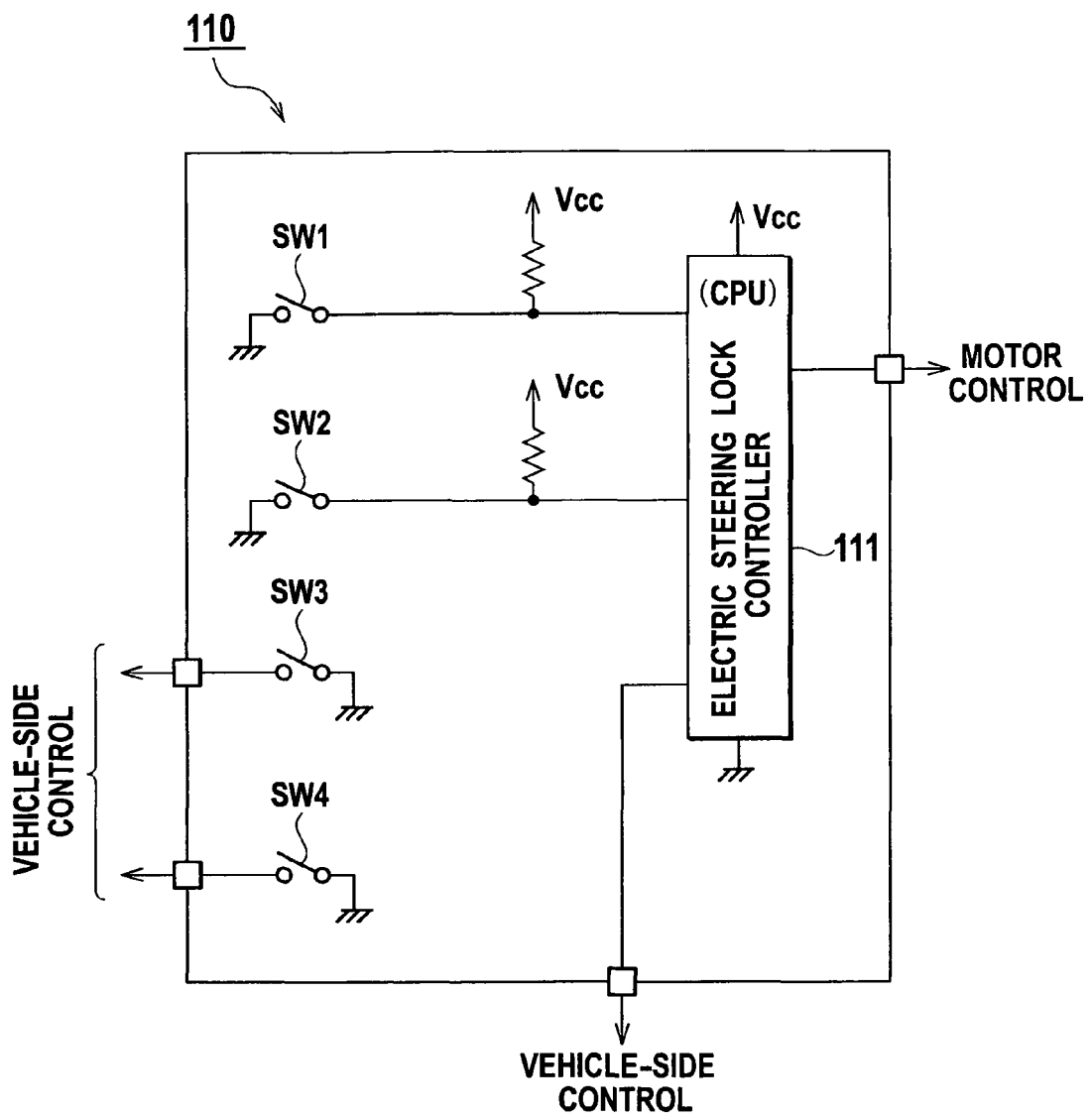
FIG. 15 is a circuit block diagram of a control system of another conventional example.
Figure 16:
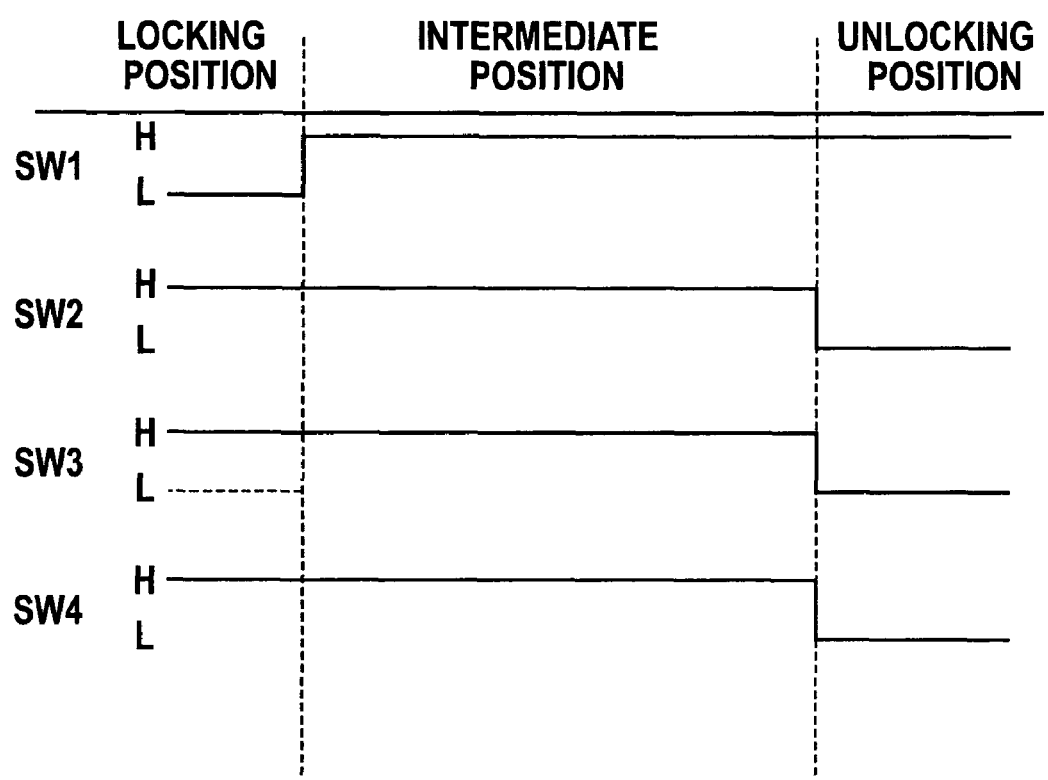
FIG. 16 is a waveform chart of outputs from respective switches.

Now, an embodiment of the present invention will be described below based on the drawings. FIGS. 1 to 13 show an embodiment of the present invention. FIG. 1 is an exploded perspective view of an electric steering lock device 1, FIG. 2 is a perspective view of principal part of operating portions in the electric steering lock device 1, FIG. 3(*a*) to FIG. 10 (*b*) are operation explanatory views, FIG. 11 is a circuit block diagram of a control system, FIG. 12 is a waveform chart of outputs, and FIG. 13 is a view showing states of output to a vehicle-side controller in a normal moment and various moments of failure when a steering shaft is in a locked state.

As shown in FIG. 1, the electric steering lock device 1 includes a housing 2 and a cover 3 which are assembled together to define a component container chamber inside, a drive unit housing 4 and a drive unit cover 5 which are housed inside this component container chamber to further define a drive unit chamber inside thereof, a motor 6 which is a driving force to be disposed inside this drive unit chamber, a worm gear 7 to be fixed to a rotating shaft 6*a* of this motor 6, a worm wheel 8 which is engaged with this worm gear 7 and rotatably supported inside the drive unit, a first cam unit 9 integrally provided on one side of this work wheel 8, a second cam unit 10 integrally provided on the other side of the worm wheel 8, a lock member 11 configured to move vertically (in a direction of an arrow a) so as to follow the first cam unit 9, a holding lever 12 configured to swing (in a direction of an arrow b) so as to follow the second cam unit 10, and a circuit board 13 disposed in the component container chamber as main components.

Figure 2:
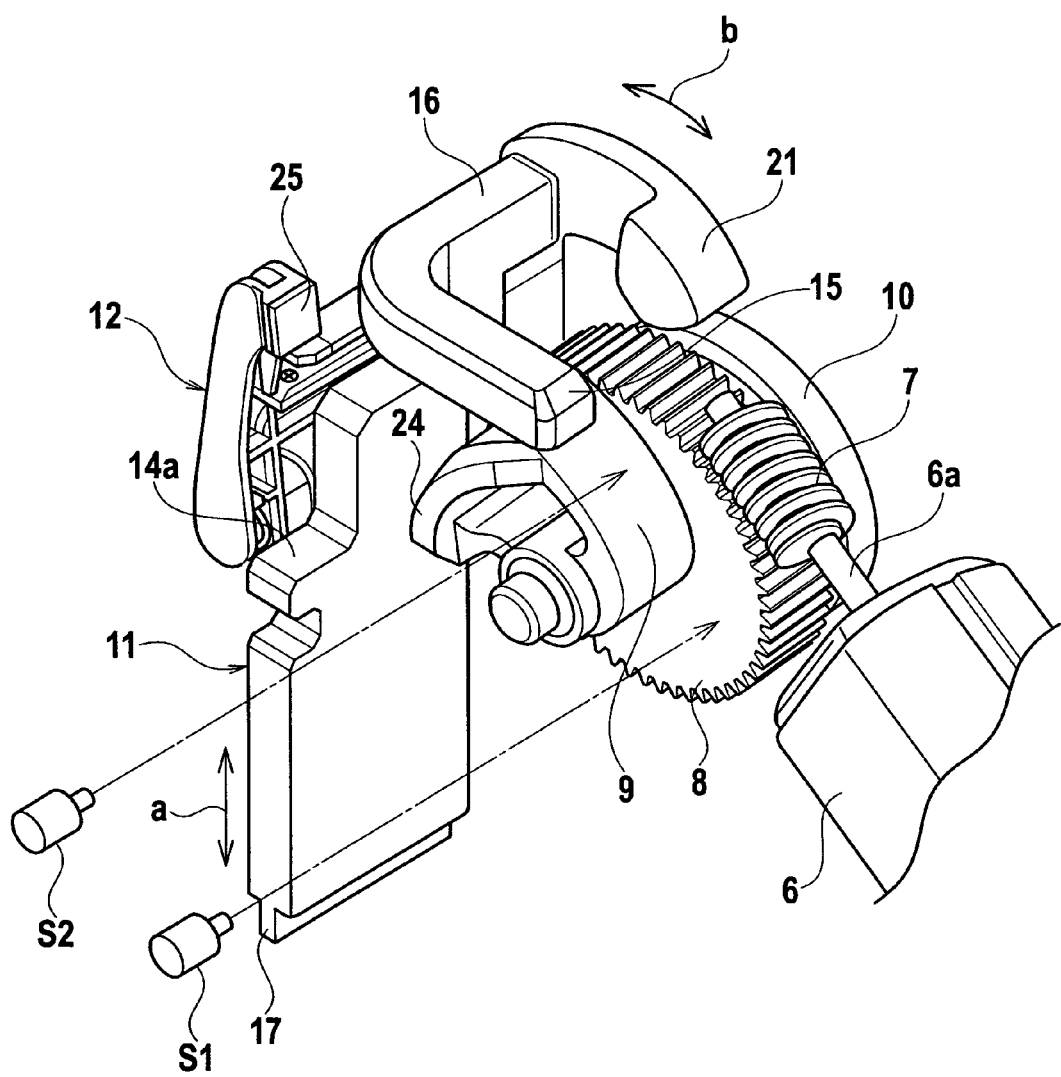
FIG. 2 is a perspective view of principal part of operating portions in the electric steering lock device showing the embodiment of the present invention.
Figure 3:
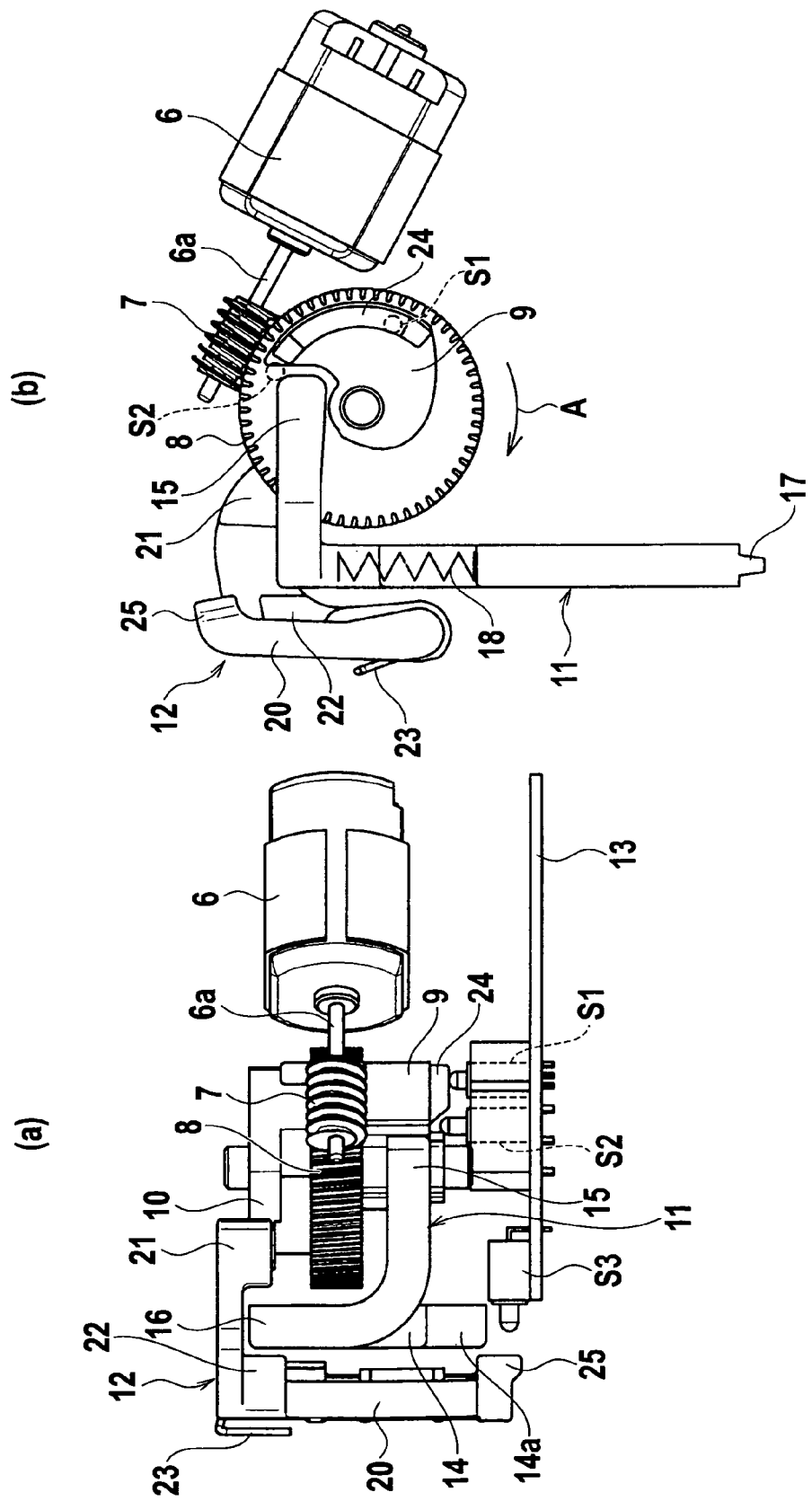
FIG. 3(*a*) is an operation explanatory view seen from an arrow U and FIG. 3(*b*) is an operation explanatory view seen from an arrow L showing the embodiment of the present invention.
Figure 4:
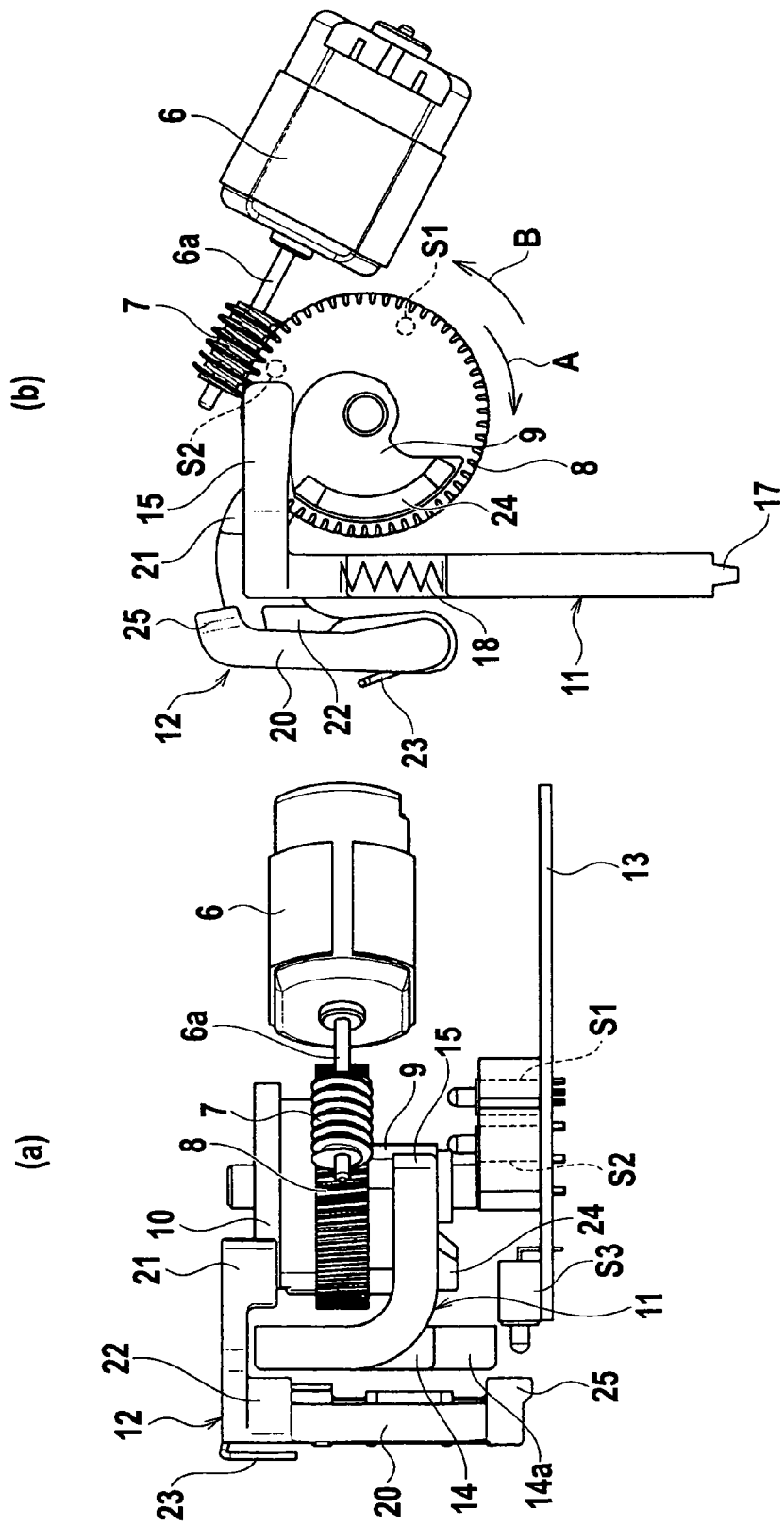
FIG. 4(*a*) is an operation explanatory view seen from the arrow U and FIG. 4(*b*) is an operation explanatory view seen from the arrow L showing the embodiment of the present invention.
Figure 5:
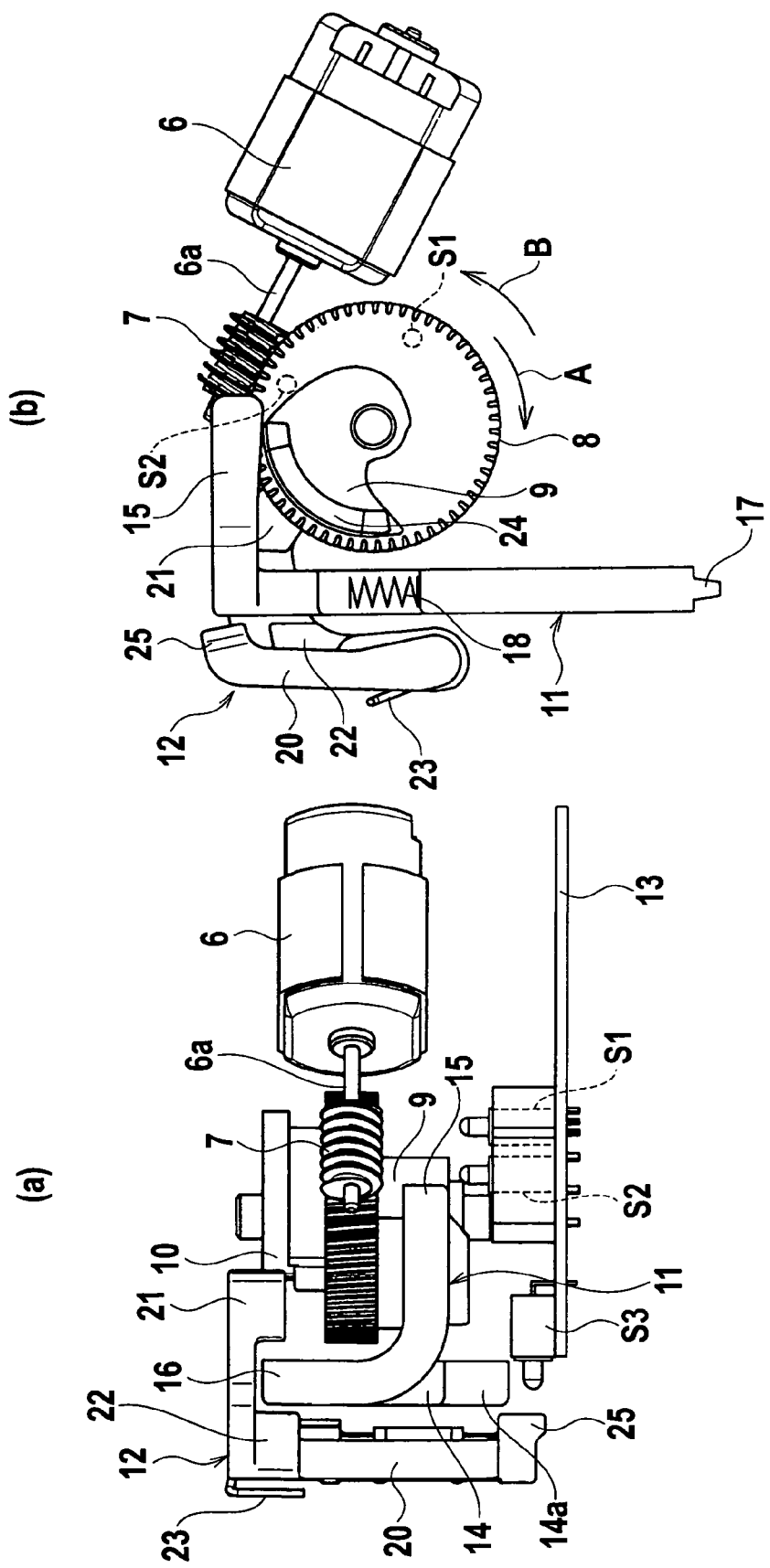
FIG. 5(*a*) is an operation explanatory view seen from the arrow U and FIG. 5(*b*) is an operation explanatory view seen from the arrow L showing the embodiment of the present invention.
Figure 6:
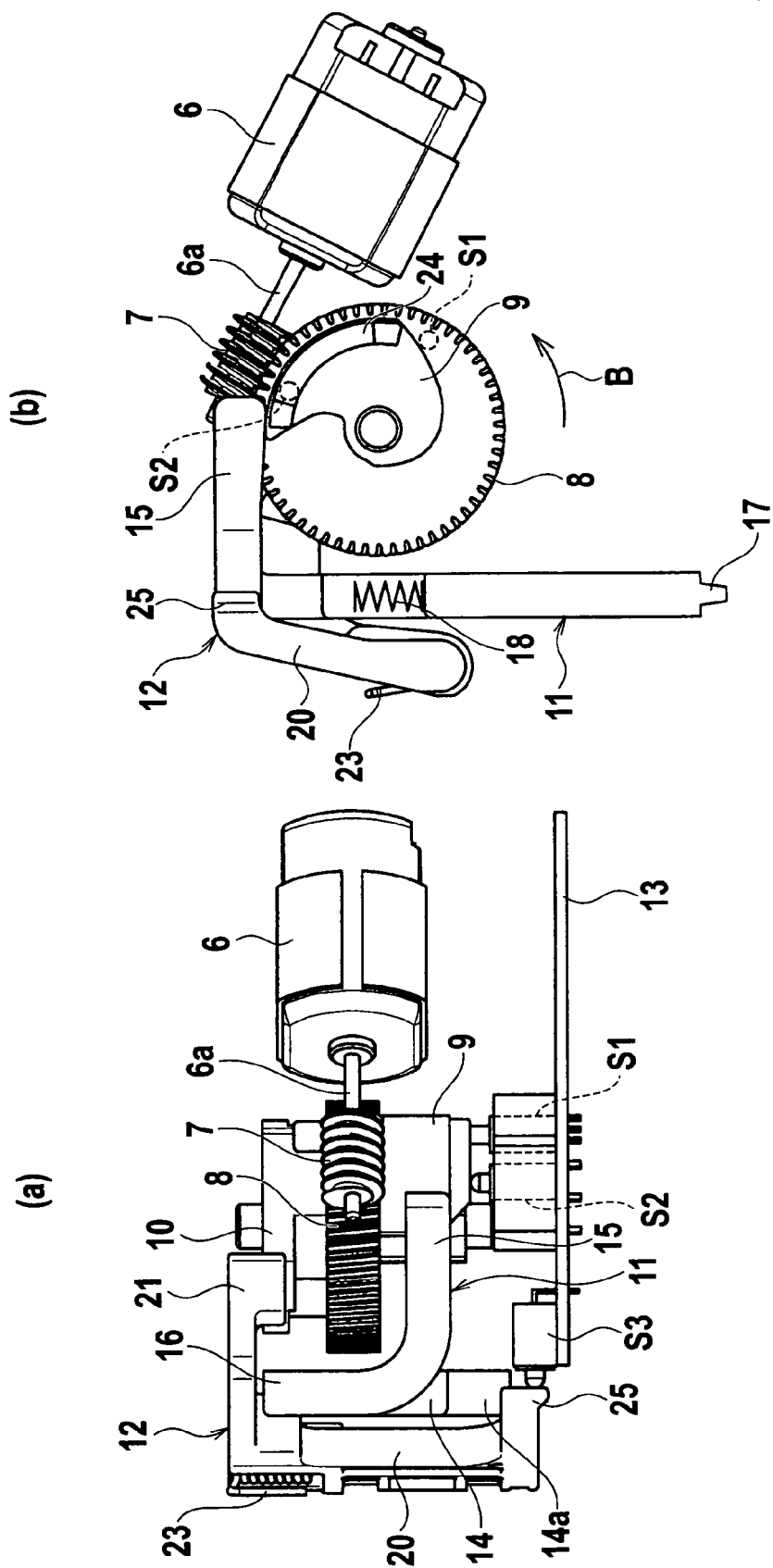
FIG. 6(*a*) is an operation explanatory view seen from the arrow U and FIG. 6(*b*) is an operation explanatory view seen from the arrow L showing the embodiment of the present invention.
Figure 7:
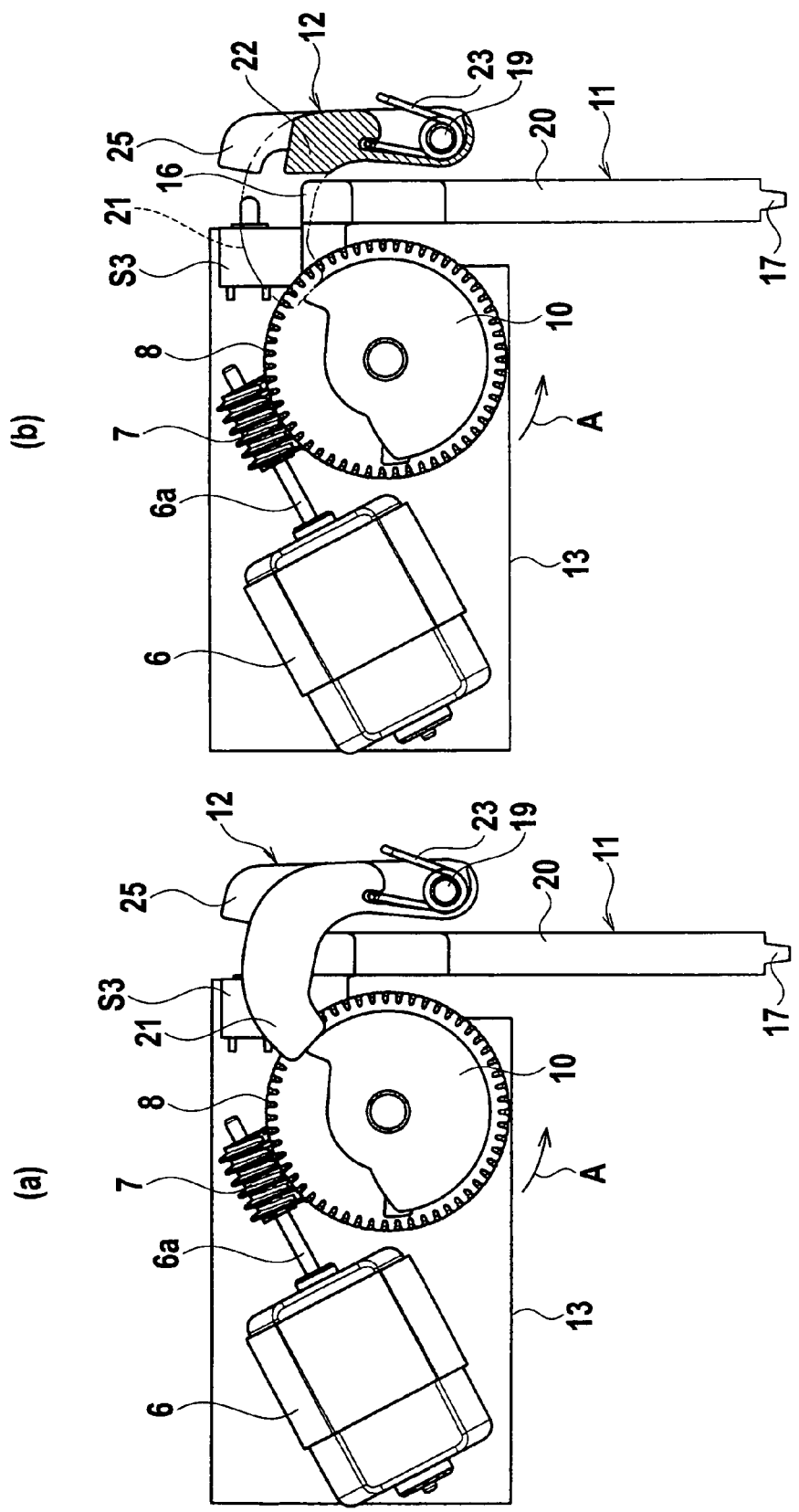
FIG. 7(*a*) is an operation explanatory view seen from an arrow R and FIG. 7(*b*) is a partially exploded operation explanatory view seen from the arrow R showing the embodiment of the present invention.
Figure 8:
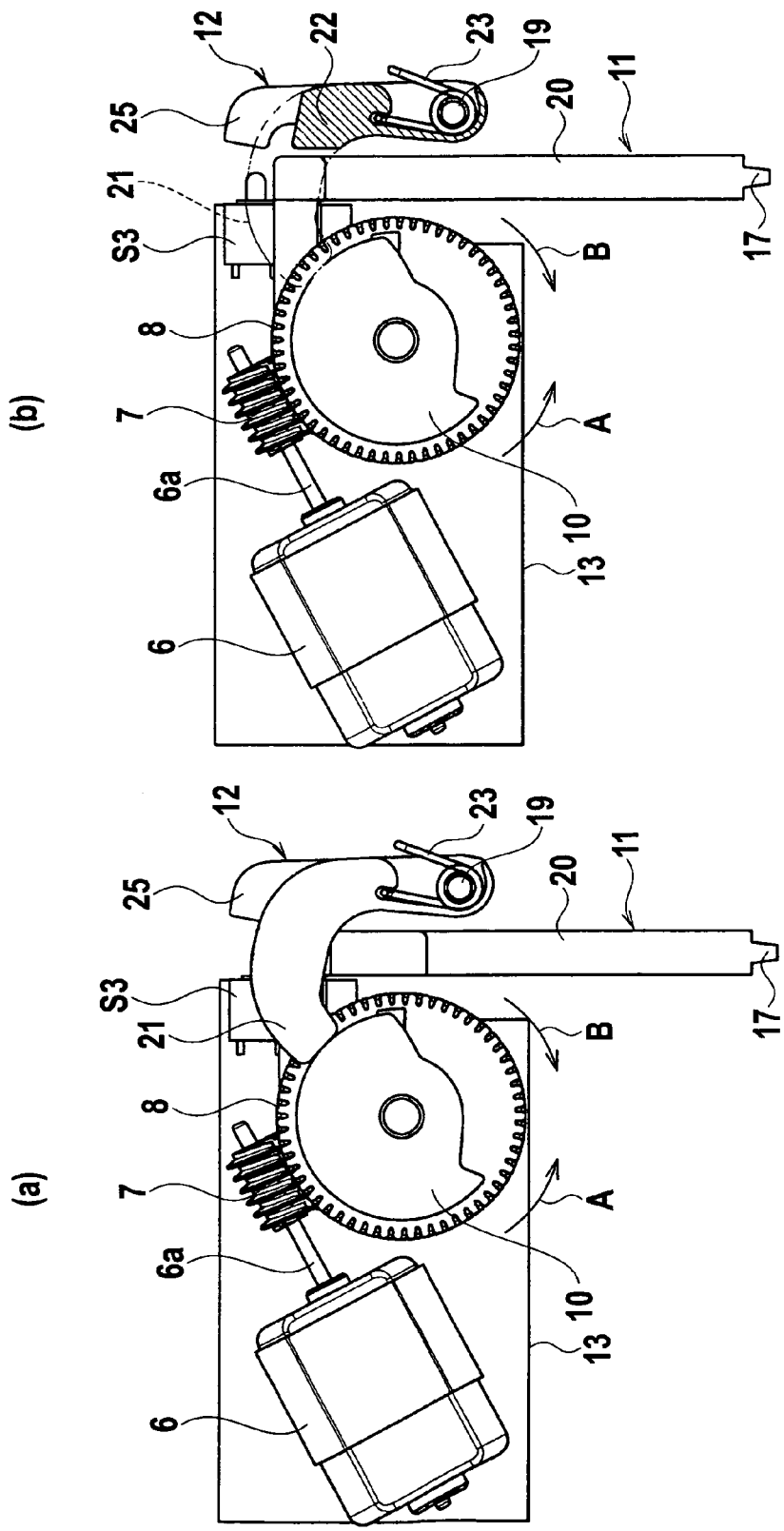
FIG. 8(*a*) is an operation explanatory view seen from the arrow R and FIG. 8(*b*) is a partially exploded operation explanatory view seen from the arrow R showing the embodiment of the present invention.
Figure 9:
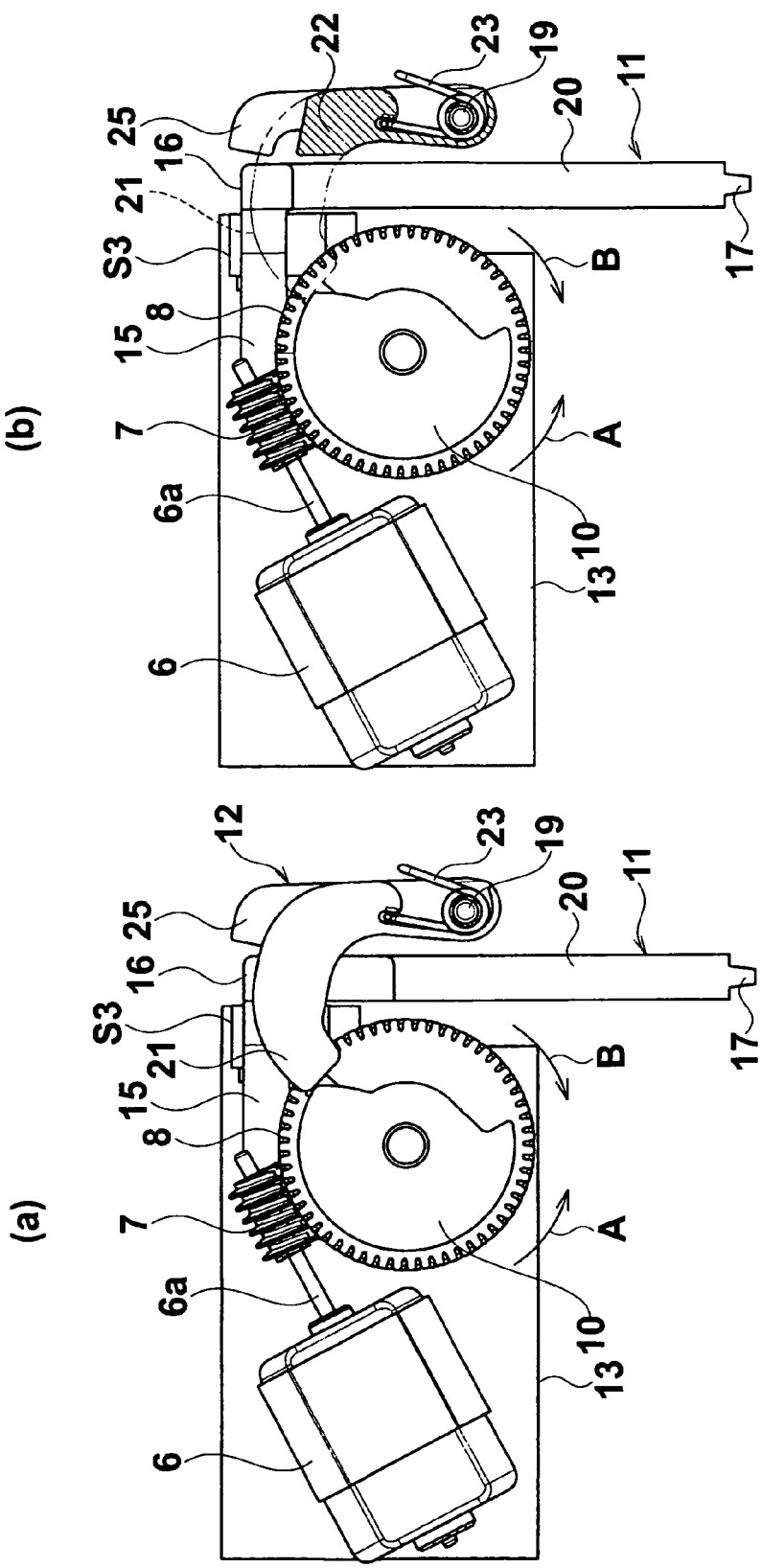
FIG. 9(*a*) is an operation explanatory view seen from the arrow R and FIG. 9(*b*) is a partially exploded operation explanatory view seen from the arrow R showing the embodiment of the present invention.

As described in detail in FIG. 2, the lock member 11 includes a flat rod portion 14 formed into a flat plate shape and provided with a spring receiving surface 14*a* by way of a notch, a cam stopping portion 15 configured to protrude in a horizontal direction from an upper part of this flat rod portion 14, a lever stopping protrusion 16 configured to protrude on the opposite side to the cam stopping portion 15, and a shaft stopping protrusion 17 provided on a lower end of the flat rod portion 14. The flat rod portion 14 is supported by a pair of guide rail portions 2*a* and 2*b* so as to be vertically movable.

Then, in the lock member 11, the shaft stopping protrusion 17 is configured to protrude outward from a hole 2c of the housing 2 and configured to be displaced between a locking position (each position shown in FIGS. 3(a), 3(b), 7(a), and 7(b)) for prohibiting rotation of a steering shaft (not shown) and an unlocking position (the position shown in FIGS. 6(a), 6(b), 10(a), and 10(b)) for permitting rotation of the steering shaft (not shown). A compression spring 18 serving as a first spring is interposed between the spring receiving surface 14a and the drive unit housing 4, and the lock member 11 is biased, by this spring force, in a direction to pressurize the first cam unit 9.

As described in detail in FIG. 2, the holding lever 12 includes a flat plate portion 20 swingably supported around a rotation support pin 19 (shown in FIG. 7(a) to FIG. 10(b)) as a center, a cam stopping portion 21 substantially protruding forward from one side on an upper end of this flat plate portion 20, and a lock stopping portion 22 (shown in FIG. 1) slightly protruding from a poison below the cam stopping portion 21 of the flat plate portion 20. The holding lever 12 swings between a standby position (the position shown in FIG. 7(a) to FIG. 9(b)) for permitting the movement of the lock member 11 and a holding position (the position shown in FIGS. 10(a) and 10(b)) for allowing the lock stopping portion 22 to be stopped by the lever stopping protrusion 16 of the lock member 11 and prohibiting the movement of the lock member 11 toward the locking position. A coil spring 23 (shown in FIG. 1 and the like) serving as a second spring is held by the rotation support pin 19 and the holding lever 12 is biased, by this coil spring 23, in a direction to pressurize the second cam portion 10.

Next, detecting means (module) for detecting positions of the lock member 11 and the holding lever 12 will be described. Position detecting means (module) for the lock member 11 includes a detection target portion 24 (FIG. 5(b)) integrally provided in a protruding manner on the first cam unit 9, and a first detection switch SW1 and a second detection switch SW2 fixed to the circuit board 13 which is opposed in a position close to this detection target portion 24. The detection target portion 24 is disposed in an arc shape on the same circumference pivotally around the worm wheel 8 as the rotation center.

The first detection switch SW1 serving as first detecting means detects the locking position of the lock member 11 and the second detection switch SW2 serving as second detecting means detects the unlocking position of the lock member 11.

Here, the first and the second detection switches SW1, SW2 described above and a third detection switch SW3 will be indicated with reference numerals S1, S2, and S3 respectively in FIG. 1 to FIG. 10 showing the structure, and will be indicated with reference numerals SW1, SW2, and SW3 respectively in FIG. 11 to FIG. 13 showing a circuit block diagram, a waveform chart of outputs, and the like.

Position detecting means for the holding lever 12 includes a detection target portion 25 slightly protruding forward from the other end side on the upper end of the flat plate portion 20 of the holding lever 12, and the third detection switch SW3 fixed to a position of the circuit board 13 close to this detection target portion 25. The third detection switch SW3 serving as third detecting means is turned off in a state where the holding lever 12 is located in the standby position and is turned on in a state where the holding lever 12 is located in the holding position. That is, the unlock position of the lock member 11 is detected. The first to third detection switches SW1, SW2, and SW3 exhibit output states as shown in FIG. 12 at a normal moment.

Next, a control system of the electric steering lock device 1 will be described. As shown in FIG. 11, the circuit board 13 is provided with an electric steering lock controller (CPU) 30 and detection outputs of the first detection switch SW1 and the second detection switch SW2 are supplied to this electric steering lock controller 30. The electric steering lock controller 30 recognizes the position of the lock member 11 using the detection outputs of the first detection switch SW1 and the second detection switch SW2 and controls the driving of the motor 6. The electric steering lock controller 30 outputs lock and unlock information to a vehicle-side controller 31. Meanwhile, the detection outputs of the second detection switch SW2 and the third detection switch SW3 are outputted from the electric steering lock device 1 to the vehicle-side controller 31.

The vehicle-side controller 31 starts an engine based on an engine start instruction, for example, on the condition that the steering shaft is located in the unlocked position. Whether or not the steering shaft is located in the unlocked position is judged by use of the lock and unlock information from the electric steering lock controller 30 and detection information from the second switch SW2 and the third switch SW3. The contents of this judgment will be described in detail in the following explanation of the operation.

Next, the operation of the electric steering lock device 1 will be described. In the locking position for the lock member 11 as shown in FIGS. 3(a) and 3(b), the shaft stopping protrusion 17 of the lock member 11 is stopped by the steering shaft (not shown), thereby inhibiting rotation of the steering shaft (not shown). In this locked position, as shown in FIG. 12, the output of the first detection switch SW1 is an High signal (hereinafter, an H signal), the output of the second detection switch SW2 is a Low signal (hereinafter, an L signal), and the output of the third detection switch SW3 is an H signal.

A driver or the like presses a steering lock-unlock button (not shown) in order to drive a vehicle in this locked state. Then, the electric steering lock controller 30 firstly confirms the location in the locked position from the output states of the first and second detection switches SW1 and SW2. After this position confirmation, the worm wheel 8 is rotated in an unlocking direction A by driving of the motor 6 and the lock member 11 follows the first cam unit 9 and moves toward the unlocking position (see FIGS. 4(a) to 5(b)). The output of the first detection switch SW1 is changed from the H signal to the L signal in a position where the first cam unit 9 is slightly rotated. The driving of the motor 6 is continued irrespective of this signal change. Then, when the lock member 11 moves to the unlocking position as shown in FIGS. 6(a) and 6(b), the output of the second detection switch SW2 is changed from the L signal to the H signal (FIG. 12). The driving of the motor 6 is stopped by this signal change. In this way, the lock member 11 is stopped in the unlocking position as shown in FIGS. 6(a) and 6(b).

Meanwhile, as shown in FIGS. 7(a) and 7(b), the holding lever 12 is located in the standby position in the locking position. Then, the holding lever 12 slides on the second cam unit 10 when the worm wheel 8 is rotated in the unlocking direction A by the above-described driving of the motor 6. The holding lever 12 is located in the standby position until immediately before the unlocking position of the lock member 11 (see FIG. 8(a) to FIG. 9(b)). Then, as shown in FIGS. 10(a) and 10(b), it is moved from the standby position to the holding position for the first time at the point when the lock member 11 moves to the unlocking position. When the holding lever 12 moves to the holding position 12, the lock stopping portion 22 of the holding lever 12 is stopped by the lever stopping protrusion 16 of the lock member 11. Then, as shown in FIG. 12, the output of the third detection switch SW3 is changed from the H signal to the L signal. In this way, the operation to the unlocking position is completed. When the lock member 11 is located in the unlocking position, the steering shaft (not shown) is freely rotatable. Moreover, since the position of the lock member 11 is retained by the holding lever 12, the lock member 11 never moves toward the locking position even if a strong impact is applied to the lock member 11. In this way, it is possible to surely prevent a situation in which the steering shaft (not shown) is locked when the vehicle is running, for example.

The driver or the like presses the steering lock-unlock button (not shown) in order to park the vehicle when the lock member 11 is in the unlocking position. Then, the electric steering lock controller 30 firstly checks whether or not the output of the first detection switch SW1 is the L signal while the output of the second detection switch SW2 is the H signal, and thus to confirm that the lock member 11 is located in the unlocking position. After the position confirmation, the worm wheel 8 is rotated in a locking direction B by the driving of the motor 6, whereby the holding lever 12 traces the second cam unit 10 and immediately moves from the holding position to the standby position. In this way, the output of the third detection switch SW3 is changed from the L signal to the H signal. The holding lever 12 displaced in the standby position slides on the second cam unit 10 but is continuously located in the standby position after moving to the locking position as shown in FIGS. 9(a), 9(b), 8(a), 8(b), 7(a), and 7(b)).

Meanwhile, when the worm wheel 8 is rotated in the locking direction B by the driving of the motor 6, the lock member 11 follows the first cam unit 9 and moves toward the unlocking position after displacement of the holding lever 12 in the standby position (see FIGS. 5(a), 5(b), 4(a), and 4(b). As shown in FIG. 12, the output of the second detection switch SW2 is changed from the H signal to the L signal in a position where the first cam unit 9 is slightly rotated. The driving of the motor 6 is continued after this signal change, whereby the lock member 11 moves to the unlocking position. Then, the output of the first detection switch SW1 is changed from the L signal to the H signal. The driving of the motor 6 is stopped by this signal change and the lock member 11 is stopped in the locking position as shown in FIGS. 3(a) and 3(b). When the lock member 11 is located in the locking position, rotation of the steering shaft (not shown) is locked. In this way, it is possible to prevent the vehicle from being stolen during parking.

Incidentally, the vehicle-side controller 31 confirms that the steering shaft (not shown) is located in the unlocked position when the engine start is initiated based on the engine start instruction. As described above, the lock and unlock information from the electric steering lock controller 30 and the detection information of the second and third detection switches SW2 and SW3 is guided to vehicle-side controller 31 as shown in FIG. 13. If all the information is normal, the H signal is supplied from the second switch SW2 and the L signal is supplied from the third detection switch SW3.

Here, when the electric steering lock controller 30 outputs the H signal due to runaway of the CPU or the like, a judgment is made that there is a failure of the electric steering lock controller 30, by using the output states of the second and third switches SW2 and SW3. Meanwhile, when the second detection switch SW2 outputs the H signal due to a failure of the second detection switch SW2, a signal indicating that the electric steering lock controller 30 is broken is outputted, and a judgment is made that there is a failure in the second detection switch SW2, by using the output of the third detection switch SW3. Meanwhile, when the third detection switch SW3 outputs the L signal due to a failure of the third detection switch SW3, a judgment is made that there is a failure in the third detection switch SW3 because both of the electric steering lock controller 30 and the second detection switch SW2 output the L signal indicating the unlocked position. Moreover, when the failure of the second detection switch SW2 and the failure due to runaway or the like of the electric steering lock controller 30 occur at the same time, the second detection unit switch SW2 outputs the H signal while the electric steering lock controller 30 outputs either the L signal or the H signal. However, it is possible to judge that there is the failure in the electric steering lock device 1 by use of the output of the third detection switch SW3. The presence of the failure is judged similarly when the failure of the third detection switch SW3 and the failure due to runaway or the like of the electric steering lock controller 30 occur at the same time.

When the presence of the failure is judged as described above, the vehicle-side controller 31 issues an alarm notice and takes a countermeasure such as checking the electric steering lock device 1 again.

As described above, according to the present invention, even if the failure on the detection switch side and the failure on the control side occur at the same time, it is possible to determine the failure of the electric steering lock device 1 by obtaining the information that the vehicle-side controller is not located in the unlocked position from the unbroken detection switch out of the second detection switch SW2 and the third detection switch SW3. In this way, even if the failure on the detection switch side and the failure on the control side occur at the same time, the signal for allowing the judgment of the failure is outputted to the vehicle-side controller 31. Moreover, it is only necessary to provide the three detection switches only. Since it is only necessary to provide the three detection switches, it is possible to achieve cost reduction and size reduction of the electric steering lock device 1.

In this embodiment, the first detection switch SW1 and the second detection switch SW2 defines the first cam unit 9 as a detection target while the third detection switch SW3 defines the holding lever 12 as a detection target. However, it doesn't matter what is the detection target, as long as the first detection switch SW1 can detect the locked position of the steering shaft and both of the second detection switch SW2 and the third detection switch SW3 can detect the unlocked position of the steering shaft.

In this embodiment, all of the first to third detection switches SW1, SW2, and SW3 are mounted on the circuit board 13. Accordingly, there is an advantage that it is easy to perform assembly, wiring, and the like of the first to third detection switches SW1, SW2, and SW3.

Note that the entire contents of Japanese Patent Application No. 2006-207994 (filed on Jul. 31, 2006) are incorporated in this specification by reference.

The present invention is not limited only the description of the above-described embodiment of the invention, but is possible in other various aspects by making appropriate modifications.

The invention claimed is:
1. An electric steering lock device, comprising:
  a lock member configured to be displaced between a locking position for prohibiting rotation of a steering shaft and an unlocking position for permitting rotation of the steering shaft, and having a holding device for selectively blocking the lock member from moving to the locking position;
  a single circuit board comprising first, second and third detection switches;

a first detecting module comprising the first detection switch, and capable of detecting the locked position of the lock member by mechanical engagement by the lock member;

a second detecting module comprising the second detection switch, and capable of detecting the unlocked position of at least one of the holding device and the lock member by mechanical engagement by said at least one of the holding device and the lock member;

a third detecting module comprising the third detection switch, and capable of detecting an engaged condition of the holding device by detecting a position of the holding device by mechanical engagement by the holding device; and an electric steering lock controller configured to determine a position of the lock member, based on detection outputs from the first detecting module and the second detecting module, and thus to control driving of the lock member, wherein lock and unlock information from the electric steering lock controller and detection outputs from the second detecting module and the third detecting module provide respective outputs indicating a state of the lock member, a state of the holding device and a sensing of a failure mode resulting from the first, second and third detection switches indicating an abnormal condition.

2. The electric steering lock device according to claim 1, wherein the lock and unlock information from the electric steering lock controller and the detection outputs from the second detecting module and the third detecting module are outputted to a vehicle-side controller.

3. The electric steering lock device according to claim 1, wherein the first detecting module, the second detecting module, and the third detecting module are mounted on a single circuit board.

4. The electric steering lock device according to claim 2, wherein the first detecting module, the second detecting module, and the third detecting module are mounted on a single circuit board.

5. An electric steering lock device, comprising:

a lock member configured to be displaced between a locking position for prohibiting rotation of a steering shaft and an unlocking position for permitting rotation of the steering shaft;

a circuit board having first, second and third detection switches mounted thereon;

a first detecting module comprising the first detection switch, and capable of detecting at least one status of the lock member by mechanical engagement by the lock member;

a second detecting module comprising the second detection switch and capable of detecting the status of at least one of the holding device and the lock member by mechanical engagement by said at least one of the holding device and the lock member;

a third detecting module comprising the third detection switch, and capable of detecting an engaged condition of a holding device by detecting a position of the holding device by mechanical engagement by the holding device; and an electric steering lock controller configured to determine a position of the lock member, based on detection outputs from at least two of the detecting modules, and thus to control driving of the lock member, wherein lock and unlock information from the electric steering lock controller and detection outputs from the second detecting module and the third detecting module provide steering lock device status data and outputs a sense a failure mode resulting from the first, second and third detection switches indicating an abnormal condition.

* * * * *